(No Model.)
A. A. HOLT.
VEHICLE RUNNING GEAR.
No. 606,414. Patented June 28, 1898.
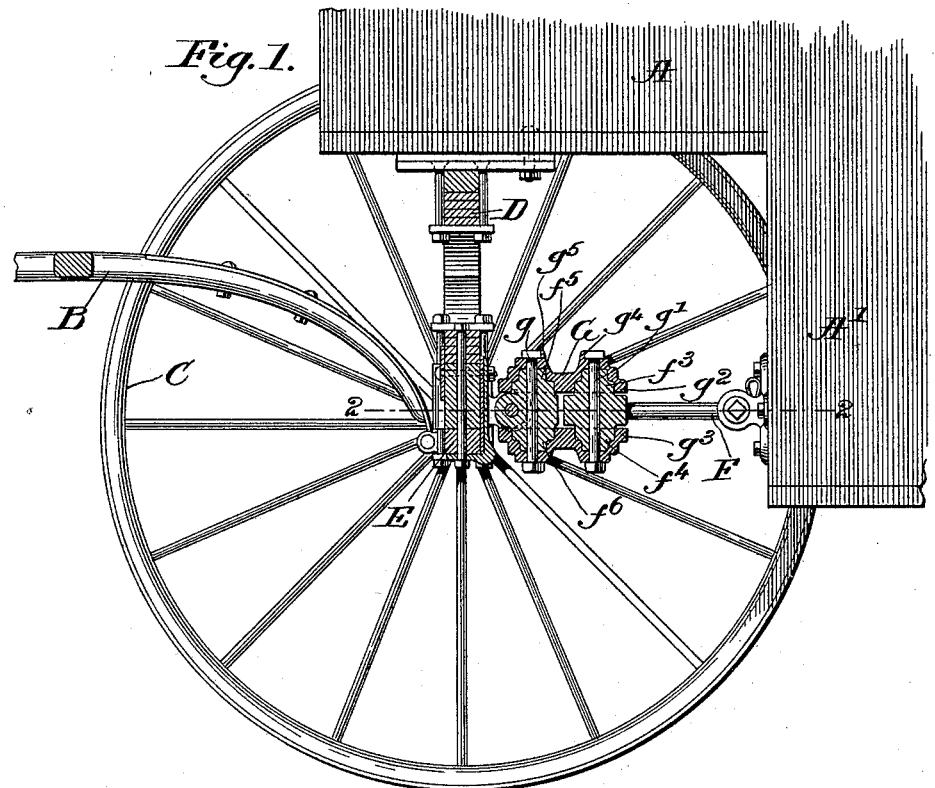
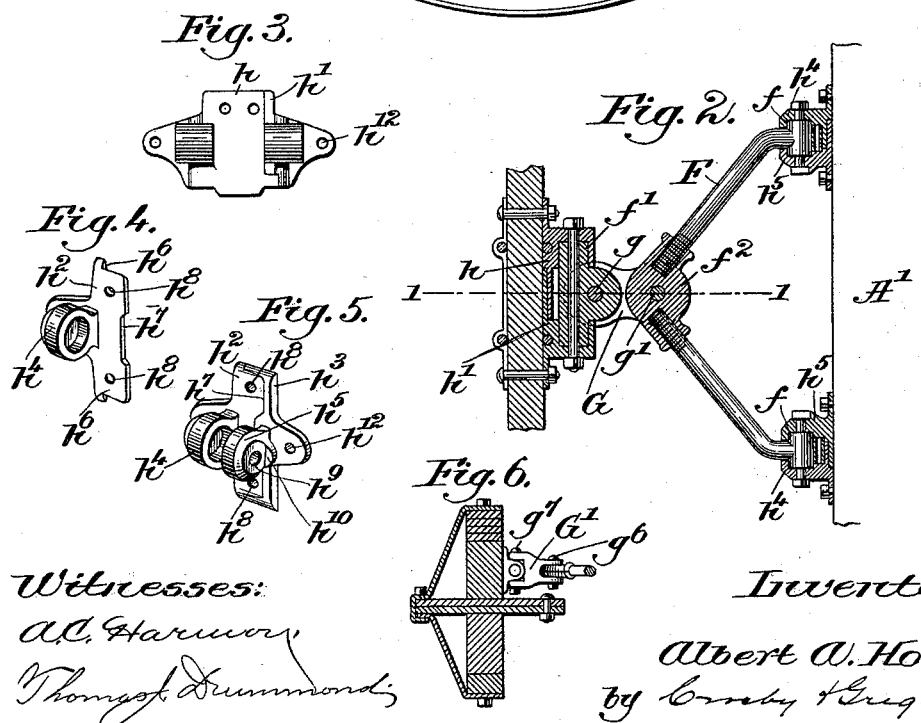
Witnesses:
A. C. Harmon
Thomas J. Drummond
Inventor:
Albert A. Holt
by Crosby & Gregory
attys.
THE NORRIS PETERS CO., PHOTO-LITHO., WASHINGTON, D. C.

UNITED STATES PATENT OFFICE.

ALBERT A. HOLT, OF FITCHBURG, MASSACHUSETTS.

VEHICLE RUNNING-GEAR.

SPECIFICATION forming part of Letters Patent No. 606,414, dated June 28, 1898.

Application filed June 7, 1897. Serial No. 639,647. (No model.)

*To all whom it may concern:*

Be it known that I, ALBERT A. HOLT, of Fitchburg, in the county of Worcester and State of Massachusetts, have invented an Improvement in Vehicle Running-Gear, of which the following description, in connection with the accompanying drawings, is a specification, like letters on the drawings representing like parts.

My invention relates to improvements in the running-gear of vehicles, particularly in that class in which there is a low-down body portion, such vehicles being commonly used as delivery-wagons, and especially as milk-wagons, it being essential, especially in the latter case, that the vehicle should be without sudden jerking movements.

Accordingly it is the object of my present invention to provide simple compact connections which will permit a pivotal side swinging movement of the depending portion of the low-down body, such as would be occasioned by the sudden lifting or lowering of one of the front wheels or by stepping heavily into the side entrance of the low-down portion of the vehicle-body. I attain this object by introducing a short link or hanger between the reach proper of the vehicle and the axle or head block of the front wheels.

A further part of my invention resides in the provision of means whereby the connected parts will maintain their proper operative positions even though the nuts and bolts thereof should get lost off, so that in case the nuts, for instance, should work off the reach, link, or any other part, as the case may be, will not drop down, as would be the case with the present constructions, and thereby cause a runaway or other disaster.

The details of construction of my invention will be understood in the course of the following description thereof, taken in connection with the accompanying drawings, illustrative of a preferred embodiment of my invention, and the latter will be more particularly defined in the appended claims, also forming a part of this specification.

In the drawings, Figure 1 is a central vertical section showing my invention in operative connection with a usual low-down-body vehicle, the view being taken on line 1 1, Fig. 2. Fig. 2 is a horizontal section thereof, taken on the line 2 2, Fig. 1. Fig. 3 is a front elevation of a pair of the retaining castings or brackets shown as having a form to secure the front end of the link connection of the reach to the axle or head block. Fig. 4 is a perspective view of one of the parts of a bracket having a form to secure one of the rear ends of the reach. Fig. 5, in perspective, shows the two parts of such a bracket placed together operatively, and Fig. 6 is a central vertical section of a modified form of construction.

The vehicle-body A, having a drop portion A', and the thills B, wheel C, spring D, axle E, and their connected parts in general may be and are of any usual or preferred construction in this class of vehicles.

To the front end of the drop portion of the body I have secured a forked reach F, this form being preferred for the reason that it gives great rigidity and bracing effect with a minimum size and weight thereof. The reach is secured to the body at its rear ends by horizontal transverse pivots $f$, a transverse horizontal pivot $f'$ being also provided adjacent the axle, so that the body is free to swing up and down relatively to the front wheels under the yielding action of the spring D.

In this class of vehicles, as before remarked, it is desirable that there should be as little movement of the body of the vehicle as possible, and therefore when one of the front wheels rides over an obstruction or drops into a rut it is desirable that the connections between the wheel or its axle and the body should yield to the sudden movement rather than that said movement should be imparted to the body. Accordingly I have herein not only provided means for the freedom of vertical movement above described, but I have also made provision for lateral movement or yielding to sudden side thrusts or impulses, this provision being secured in the present form of my invention by means of a short link G, connecting the apex or front extremity of the reach F with the horizontal pivot $f'$, this link being pivoted at each end to the said parts, pivot-bolts $g\ g'$ being herein shown for the purpose.

The reach is herein shown as formed by having its divergent rear ends secured by a central casting $f^2$, this casting having at its top and bottom shouldered tops or lugs $f^3 f^4$, the rear portion of the pivot member $f'$ being also similarly formed, as indicated at $f^5 f^6$, and the short link or hanger G is formed in two parts $g^2 g^3$, recessed on their inner sides to fit snugly over the projections or lugs of the adjacent parts and are clamped thereon in position, as clearly shown in Fig. 1, the upper member or plate of the link G being preferably provided with shoulders $g^4 g^5$, against which the bolt-heads may bear to prevent their turning.

In Fig. 6 I have shown a link G', formed in one piece at the top and bottom and secured by means of ordinary bolts $g^6 g^7$ to the reach and a casting or bracket, respectively, the action being the same so far as the lateral movement is concerned as in the construction shown in Fig. 1.

Viewing Figs. 3 and 5, it will be seen that the holding-brackets are each made in two parts, $h\ h'$ designating the parts retaining the front pivot $f'$, and $h^2\ h^3$ designating in Fig. 5 the parts for securing either end of the rear part of the reach, the part $h^2$ being shown in further detail in Fig. 4. Each part of these brackets is formed to constitute a portion of the back or securing plate thereof, and also has a projecting cup-shaped lug $h^4$ or $h^5$, one part overlapping the other, as indicated at $h^6$, and preferably interlocking, as indicated at $h^7$, the screw or bolt hole $h^8$ of one member registering with that of the superimposed member, so that the two parts of each bracket are necessarily held together, and thereby the pivot part, retaining, for instance, the rear end of the reach or the forward pivot $f'$, is held at each of its ends by the cups $h^4\ h^5$, being thus secured in place by a bolt passed through the cups and retained portion at $h^9$, one of the members of the bracket being provided with a squared shoulder $h^{10}$ to prevent the working loose of the bolt, as clearly indicated in the sectional view Fig. 2, the brackets being herein shown as further provided with lateral retaining-ears perforated at $h^{12}$ to receive the holding screws or bolts.

From the above description it will be evident that in case the holding-nut or even the bolt itself should lose out from either end of the reach or other connection the part—the reach, for instance—would not drop down or get loose, for the reason that its shoulder would be held firmly and in proper position by the cups of the holding-brackets. I regard this feature of my invention as of very great practical importance, it not only preventing the parts becoming disrupted by the loosening of a nut, but it also brings the draft strains mainly on the shoulders or corners of the castings instead of on the bolts.

The operation of my invention is as follows: The reach F gives a rigid firm draft, preventing swinging of the body, this being particularly true of the form of reach herein shown, and the link or hanger G provides the desired give or yielding movement to sudden side thrusts, this short link, placed as it is, also permitting the front running-gear and the body to swing around quickly toward each other with slight lateral movement, so that if one wheel should suddenly rise and fall relatively to the other the movement will all be taken up by the mechanism in front of the drop-body A, the horizontal pivots taking the relative change in vertical position of the body and wheel or wheels and the link yielding one way or the other to take the side thrust. The front draft or pull is borne largely by the cup-shaped bearings of the brackets and of the link coöperating with the shoulders of the retained parts—that is to say, by the shoulders of the rear ends of the reach and by the shoulders of the forward end thereof and of the rear portion of the pivot member $f'$.

While I have herein described the preferred embodiment of my invention and the preferred relations of the parts, yet I wish it understood that I am not limited thereto, inasmuch as various features of my invention may be employed in other connections.

It will be noticed that in Fig. 1 I have shown the fifth-wheel above the spring and in Fig. 6 below the spring, being mounted on the axle-bed above the axle. In Fig. 1 I have shown the short link connected directly to the axle and axle-bed, and in Fig. 6 I have shown it connected to the head-block. I mean to include these and any other style of running-gear as within the scope of my invention.

The bracket, as shown in Fig. 5, for instance, may be readily adapted to various parts of the vehicle—as, for example, as a coupling for wagon or buggy shafts—and thereby prevent accident.

Having fully described my invention, what I claim, and desire to secure by Letters Patent, is—

1. In a vehicle running-gear, the combination with a forked reach having its separated rear ends pivotally connected to the body of the vehicle, of a short link connecting the front end of said reach with the front running-gear, said short link being vertically pivoted at its ends, substantially as described.

2. In a vehicle running-gear, the combination with a forked reach having its separated rear ends pivotally connected to the body of the vehicle, of a short link connecting the front end of said reach with the front running-gear, said short link having a vertical pivot connection at its rear end to the reach and a compound vertical and horizontal connection at its front end to the said front running-gear, substantially as described.

3. The combination with a forked reach, pivotally connected to a vehicle-body at its separated rear ends, and extending at its forward end close to the front axle of the vehicle, of a short casting or bracket mounted on the front running-gear, and a short link connecting said reach to said casting or bracket, said short link having a vertical pivot connection at one end and a compound vertical and horizontal connection at its other end, substantially as described.

4. In a vehicle running-gear, a link or hanger connecting the body with the front running-gear, said link having a vertical pivot at each end thereof, and being formed in two parts oppositely disposed, one above the portion to which it is secured and one below the same, said link having recesses at its respective ends concentric with its pivots to receive correspondingly-formed projections on the inclosed portions, substantially as described.

5. The combination with a reach pivotally connected to the body of the vehicle for vertical movement and rigid against lateral movement, of a short link connecting the front end of said reach with the front running-gear, said short link being vertically pivoted at its ends, substantially as described.

6. A bracket adapted to retain the shouldered ends of the reach, said bracket being formed in two plate-like parts, adapted to be overlapped on each other, and having registering bolt-holes, the inner edge of one of said overlapping parts having an interlocking portion $h^7$ in the form of a reëntrant angle coöperating with an interlocking ridge and projection on the other part, and said parts having cup-shaped lugs extending outwardly and facing each other, substantially as described.

In testimony whereof I have signed my name to this specification in the presence of two subscribing witnesses.

ALBERT A. HOLT.

Witnesses:
F. A. CURRIER,
J. M. BLANCHARD.